July 17, 1962

L. E. KILNESS 3,044,591

RATCHET MECHANISM

Filed Aug. 31, 1959

INVENTOR.
LUTHER E. KILNESS
BY

ATTORNEYS

July 17, 1962

L. E. KILNESS 3,044,591

RATCHET MECHANISM

Filed Aug. 31, 1959

INVENTOR.
LUTHER E. KILNESS
BY
ATTORNEYS

July 17, 1962
L. E. KILNESS
3,044,591
RATCHET MECHANISM
Filed Aug. 31, 1959
5 Sheets-Sheet 3
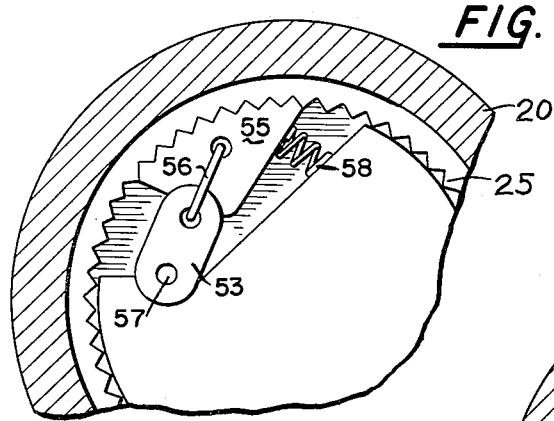
FIG. 8.
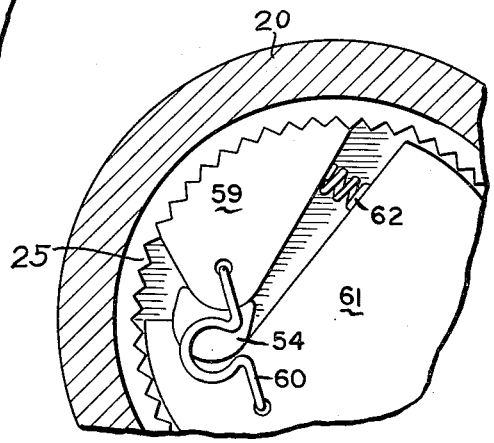
FIG. 9.
FIG. 10.
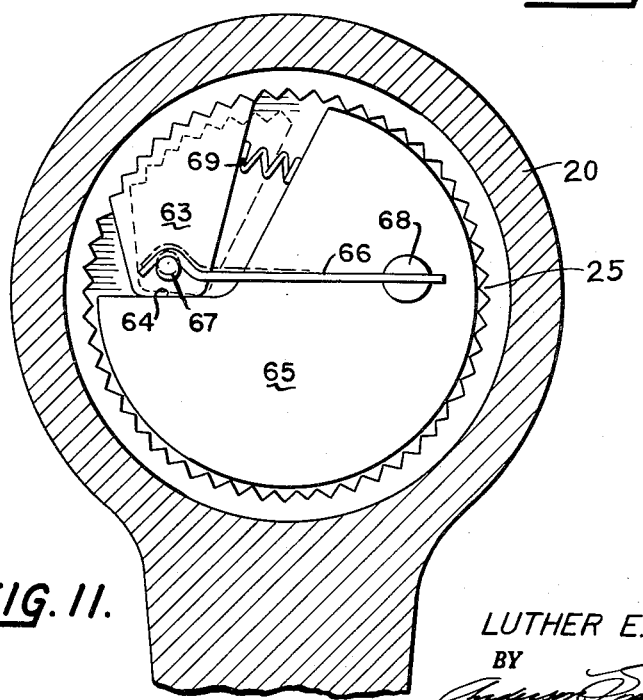
FIG. 11.
INVENTOR.
LUTHER E. KILNESS
BY
*Anderson, Spangler & Wymore*
ATTORNEYS July 17, 1962  L. E. KILNESS  3,044,591
RATCHET MECHANISM Filed Aug. 31, 1959  5 Sheets-Sheet 4

INVENTOR.
LUTHER E. KILNESS
BY
ATTORNEYS

July 17, 1962  L. E. KILNESS  3,044,591
RATCHET MECHANISM

Filed Aug. 31, 1959  5 Sheets-Sheet 5

INVENTOR.
LUTHER E. KILNESS
BY
ATTORNEYS

United States Patent Office 3,044,591
Patented July 17, 1962

3,044,591
RATCHET MECHANISM
Luther E. Kilness, Denver, Colo.
(211 E. Philadelphia St., Rapid City, S. Dak.)
Filed Aug. 31, 1959, Ser. No. 837,259
24 Claims. (Cl. 192—43.1)

This invention relates to ratchet mechanisms and has particular reference to ratchet wrenches. This application is a continuation-in-part of my prior application Serial No. 636,255 filed January 25, 1957, now abandoned, which is a continuation of my application Serial No. 532,984 filed September 7, 1955, now abandoned, and which is further a continuation of my application Serial No. 245,481 filed September 7, 1951, now abandoned.

My co-pending application Serial No. 670,191 filed July 5, 1957, now U.S. Patent No. 2,981,389 issued April 25, 1961, for "Ratchet Mechanism" is related to similar subject matter and is directed to a specie falling within the broad teaching of the instant application.

Recent improvements in the ratchet art as applied to hand tools have centered on the development of round-head ratchets having one or more pawls carried inside an annular head. These ratchets have a more compact head and can be made with a large number of internal teeth in the head giving more ratcheting positions. Conventional pawls used in round-head ratchets have been made with two or three teeth which engage only a small percentage of the teeth inside the head. The limited number of teeth engaged concentrates the stress over a small area on the pawl and also on the wrench head. It would be desirable to greatly increase the number of teeth on the pawl and distribute the stress over a greater area. However, merely increasing the number of teeth on the conventional pawl would not produce the desired result because the fixed-pivot pawl and the slide pawl commonly used cannot be seated adequately for a large number of ratchet teeth. Other pawls using a large number of teeth have been devised for round-head ratchets, but the seating of the pawls has not been satisfactory under all conditions encountered in actual manufacture and use.

A pawl carried by a work-turning member and which has a large number of teeth is shown in my Patent No. 2,554,990 issued May 29, 1951. The pawl seating shown in this patent consists of two bearing surfaces at the ends of an arcuate toothed side of the pawl. The pawl bearing surfaces engage corresponding surfaces at the ends of a pawl recess. The pawl bearing surfaces are free to slide on the recess bearing surfaces and therefore permit free adjustment of the pawl to teeth in an annular head. The free adjustment action of the pawl results in an effective use of the pawl teeth. This form of seating has been further improved in the present invention to bring and maintain the entire arcuate side of the pawl into as close alignment as possible with the teeth on the opposing member. While the multi-toothed type of pawl shown in Patent No. 2,554,990 has been found satisfactory for the intended use, the controls shown in Patent No. 2,554,990 have certain limitations in avoiding backlash, permitting convenient reversal of the pawl, and providing for ease of commercial production.

One object of the present invention is to provide an improved ratchet mechanism of the type first shown in my Patent No. 2,554,990.

Another object is to provide more efficient operating controls for the type of multi-toothed pawl shown in Patent No. 2,554,990.

In ratchet mechanisms where spatial requirements preclude the use of bulky mechanisms, the employment of a reversible pawl which uses all of the pawl teeth for both driving directions permits a considerable reduction in size of the ratchet mechanism for the same load carrying capacity. In addition, the ratchet parts may be reduced in number and have a simplified character. The present invention consists of a ratchet mechanism of high strength, which in its best form includes a reversible pawl having a series of teeth which are used for driving in both directions. The pawl is resiliently positioned in a pawl-carrying body. Inclined bearing surfaces on the pawl engage opposing bearing surfaces on the pawl-carrying body. A tooth-carrying body is slidably mounted for movement adjacent to the pawl-carrying body and opposing the pawl. For rotary ratchet mechanisms, prior art workers have used two body members, one journalled for rotative movement in the other, and have positioned the pawl elements on either of the body members. In the embodiments selected for the specific illustration of the inventive concept, the pawl-carrying body is mounted for rotation within the tooth-carrying body. The invention further includes control members of an efficient and simple design intended to bring the pawl into correct engagement with the teeth in the tooth-carrying body, together with seating constructions for the pawl which serve to drive and maintain the pawl into full and concurrent engagement with the teeth in the tooth-carrying body. The seating arrangements comprehend the use of either adjustable bearing constructions or improved forms of integral bearing constructions.

For a better understanding of the present invention, together with other and further objects thereof, reference is had to the following description taken in connection with the accompanying drawings, and its scope will be pointed out in the appended claims.

In the drawings, FIGURE 1 is a perspective view of a ratchet wrench embodying the mechanism of the invention.

FIGURES 8 and 9 are fragmentary sections of embodiments having modified forms of the adjustable bearing structure.

FIGURE 10 is a detail view of a spring used in the embodiment shown in FIGURE 8.

FIGURE 11 is a sectional view showing another modification of the invention.

Figure 12:
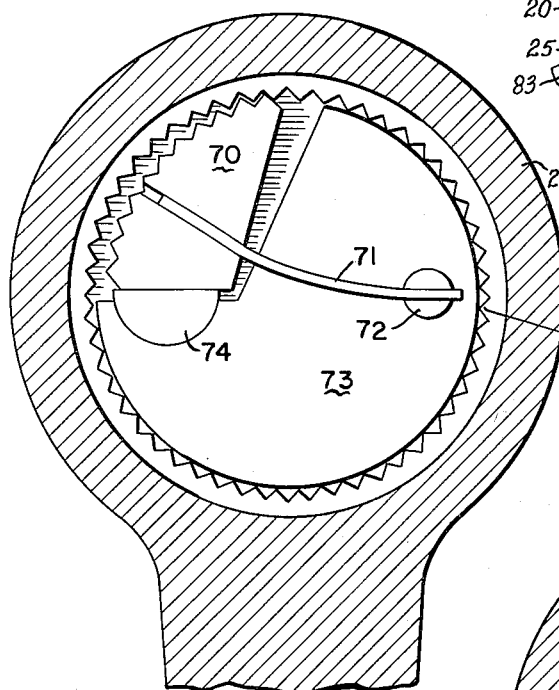
Figure 13:
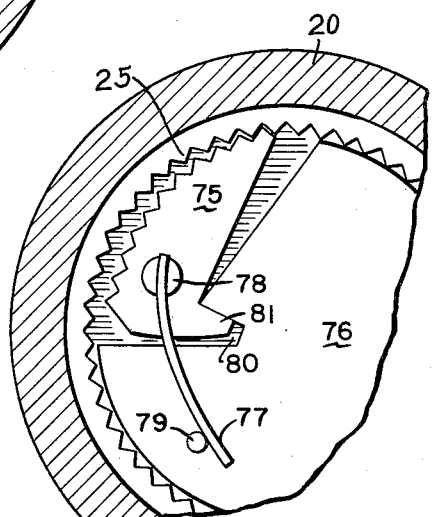
Figure 14:
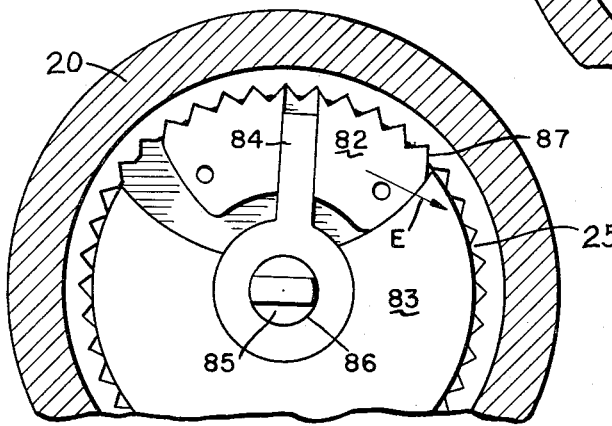

FIGURES 12, 13, and 14 are sectional views showing further modifications of the invention.

Figure 15:
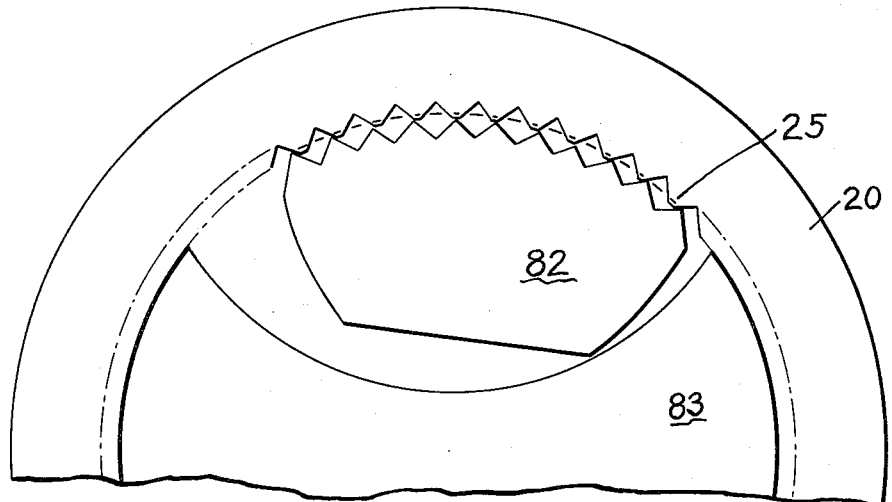
Figure 16:
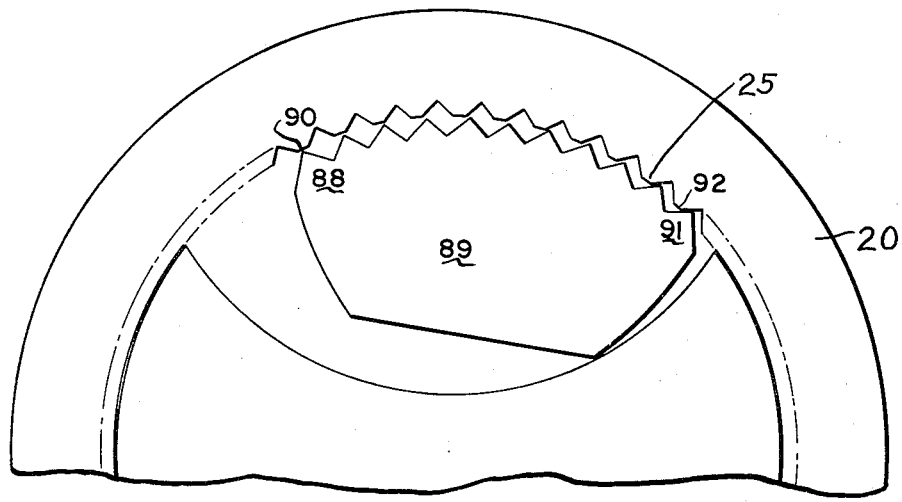

FIGURES 15 and 16 are diagrammatic views illustrating misalignment of the pawl.

Figure 17:
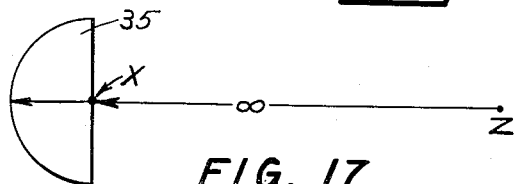

FIGURE 17 is a plan view of a bearing according to this invention to an enlarged scale illustrating bearing surfaces generated from different centers of curvature.

Figure 18:
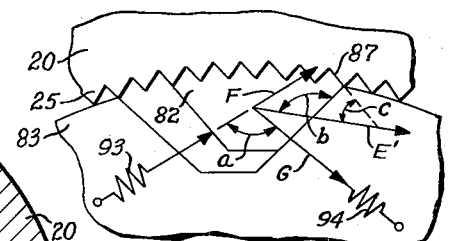

FIGURE 18 is a diagrammatic representation of the forces applied to the pawl by the control springs.

Figure 1:
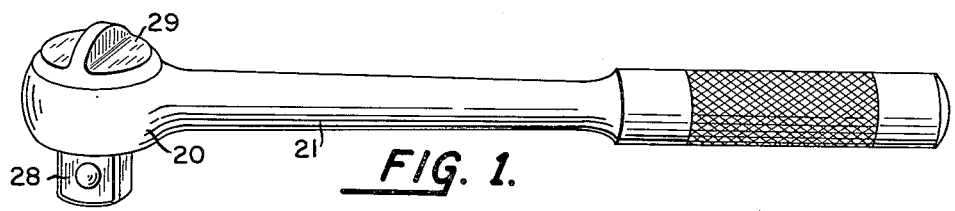
Figure 2:
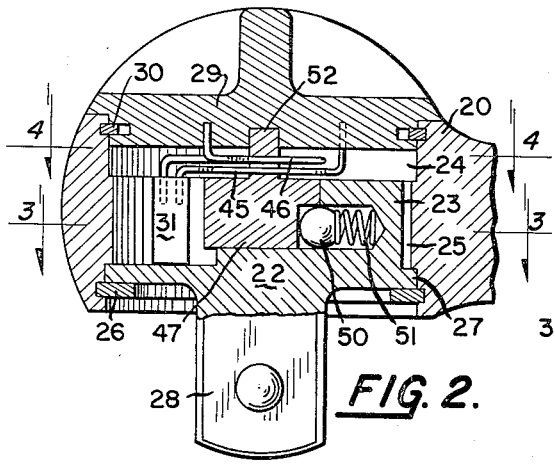
FIGURE 2 is a vertical section taken substantially through the center of the wrench head shown in FIGURE 1.
Figure 3:
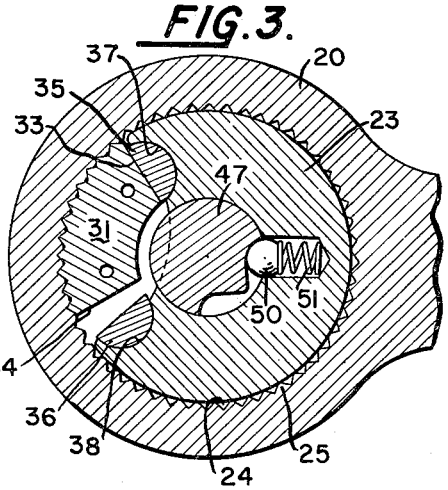
FIGURE 3 is a sectional view taken on the line 3—3 of FIGURE 2.
Figure 5:
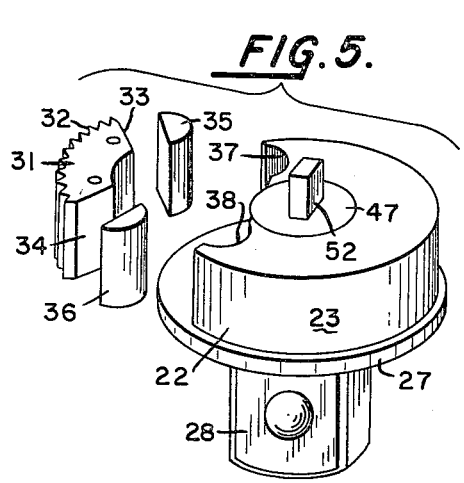
FIGURE 5 is an exploded view of the pawl and associated internal parts shown in FIGURES 2, 3, and 4.
Figure 4:
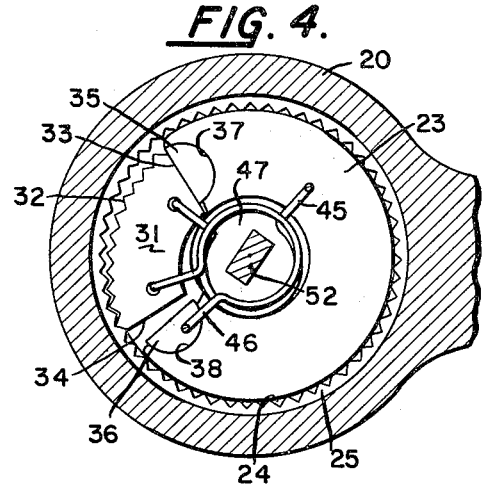
FIGURE 4 is a sectional view taken on the line 4—4 of FIGURE 2.

In the embodiment shown in FIGURES 1 through 5, a driving member 20 has an integral handle 21 for manual actuation. A work-turning or driven member 22 has a head portion 23 rotatably mounted in a circular opening 24 in the driving member 20. The internal surface of the circular opening 24 is provided with a plurality of radially extending teeth 25. The lands of teeth 25 may be formed with small flats for journalling the head portion 23. The journal formed by the flats of the teeth 25, which define portions of a circumferential surface as shown in FIGURES 3, 4 and in the enlarged view of FIGURE 16, will necessarily absorb the reactive force of the pawl means on the body members when the mechanism is under load. This reactive force is transmitted through the head portion to the flats on the teeth opposite the pawl means. By taking the reactive force of the pawl means on the flats of the teeth 25, any additional hub sections on the head portion, which would otherwise be needed for journalling the head portion in the circular opening, may be eliminated.

The turning member 22 is secured to the driving member 20 by a split retaining ring 26 which expands into a groove in the circular opening 24 and holds against an outer flange 27 on the turning member 22. A shank 28 is formed on one end of the turning member 22 for holding interchangeable sockets. A shift cap 29 seals the top of the circular opening. A split ring 30 at the top of the circular opening retains the shift cap in assembly.

A recess is formed on one side of the head portion 23 open to the teeth 25 of the circular opening 24. The sidewalls of the recess adjacent to the teeth 25 are inclined toward each other and form straight lines which converge in a direction away from the teeth 25. The sidewalls of the recess may conveniently be planar surfaces, as shown in the perspective view of FIGURE 5. The straight sidewalls of the recess permit radial disengagement of the pawl means from the teeth 25 with a minimum amount of circumferential movement as compared with a concave recess such as shown in my United States Patent 2,554,990 and as exemplified in FIGURE 16. The reduced circumferential travel of the pawl with a straight side-wall recess permits a reduction in the backlash of the ratcheting action and also permits the sidewalls of the recess to be spaced closer together.

A pawl 31 is carried in the recess on the head portion 23. The pawl has a long arcuate side having a plurality of teeth 32 adapted to concurrent driving engagement with the teeth 25 in the circular opening. The pawl should have a plurality of teeth, and the number may conveniently be at least three or more, depending on the pitch of the teeth. The toothed side of the pawl may conveniently encompass on the order of 20% or more of the teeth in the circular opening 24. The pawl teeth and the teeth in the circular opening have load surfaces inclined away from a radial direction to allow compressional forces to be transmitted directly through the teeth. The recess within head portion 23 containing the pawl 31 is larger in at least one dimension than the pawl to permit an inward withdrawal of the pawl from the teeth in the circular opening and also to permit angular or circumferential displacement of the pawl relative to the head portion. The action of the pawl 31 is reversible, with the pawl teeth being used for both ratcheting directions.

The thrust of the pawl 31 is transmitted to the head portion 23 through pawl bearing surfaces 33 and 34. The pawl thrust is received by a bearing surface associated with that part of the head portion 23 receiving the thrust. In the embodiment of FIGURES 1 through 5, the bearing surfaces of the head portion include alignment means in the form of bearings 35 and 36 having nonconcentric surfaces with different centers of curvature and more specifically of semicylindrical shape and occupying semicylindrical recesses 37 and 38 on two opposing thrust-receiving sides of the recess in the head portion 23. The two centers of curvature provide the pawl with two degrees of freedom with respect to the head portion 23 and teeth 25. At least one of the degrees of freedom may be rotational movement of the pawl about one center of curvature. The other degree of freedom may be rotative movement about the other center of curavture. One center of curvature could approach infinity, as for a planar surface, to give the pawl one degree of translational freedom. The bearings 35 and 36 may be held in the semicylindrical recesses by a retaining means such as springs and the like, not shown. In the absence of special retaining means the bearings may loosely occupy the spaces between the pawl 31 and the head portion 23 as long as such spaces are kept close to the minimum space needed for free pawl action. Referring to FIGURE 17, it will be seen that one surface of the bearings is formed from center X while the other surface being substantially flattened may be formed from a center Z, which may conveniently be at infinity.

Under load, the bearings 35 and 36 are forced to line up exactly with the bearing surfaces on the pawl 31. One advantage of the self-adjusting bearings over the structure shown in my Patent No. 2,554,990 is that no excessive local forces can develop on the bearing surfaces, regardless of wear of the parts, heavy stresses causing distortion of the wrench head, or slight differences in bearing surfaces due to manufacturing tolerances. A second advantage of the bearings 35 and 36 is that the forces transmitted to the pawl may be directed with precision under all conditions and therefore can give a more even distribution of the forces acting on the individual teeth. A third advantage of adjustable bearings is that the contact area of the bearings may be increased substantially over that for integral bearings without adversely affecting the pawl action.

Figure 6:
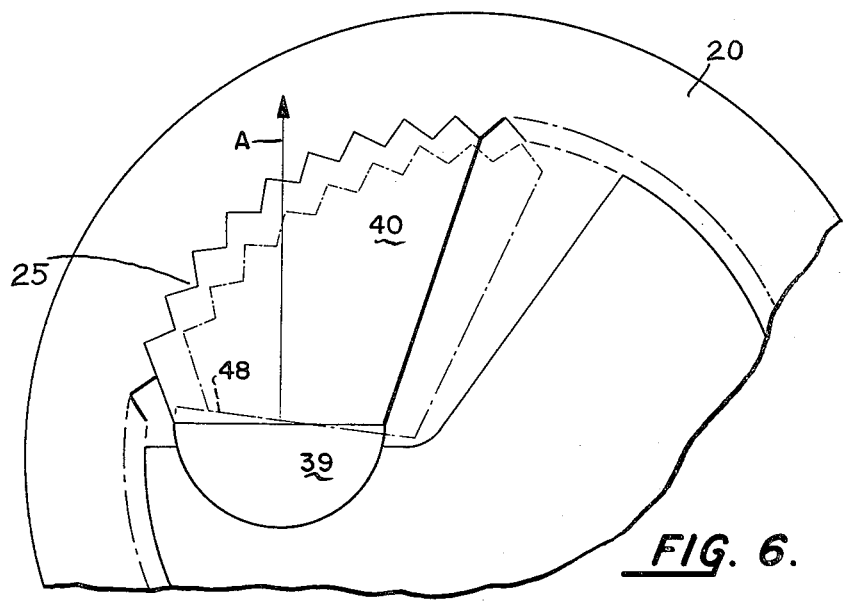
FIGURES 6 and 7 are diagrammatic views to an enlarged scale illustrating seating of simplified forms of the pawl both with and without an adjustable bearing structure.
Figure 7:
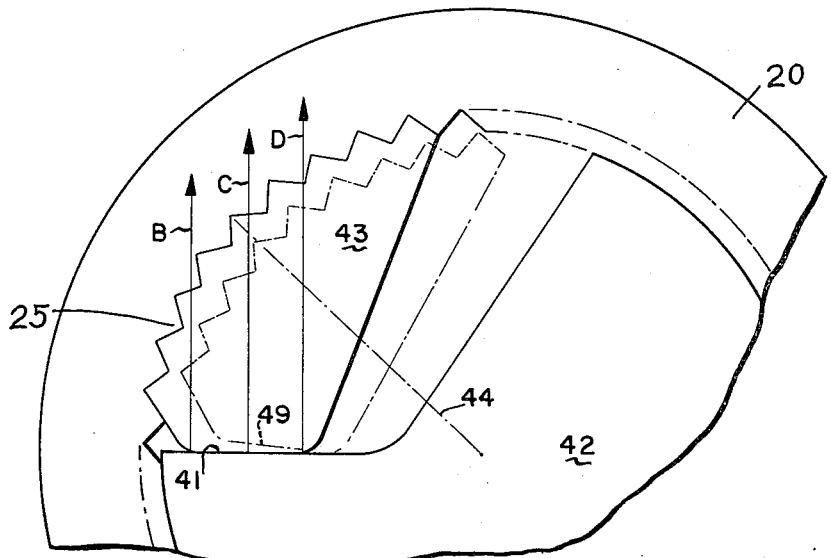

The thrust-transmitting bearings 35 and 36, constructed and arranged as shown relative to the pawl, provide for the resultant force acting on the pawl 31 from the bearings to pass through a locus intermediate the pawl teeth at the extremities thereof and can by slight modification be designed to have any line of action required for maximum efficiency. For maximum efficiency with compression-type teeth, i.e. having load surfaces formed at substantially less than 90° with the envelope of the pawl teeth, this force should be the vector sum of equal forces from each pawl tooth acing along a line perpendicular to the load surface of each tooth combined with a radial force through the center of the pawl teeth for overcoming the effects of foreign material in the teeth and otherwise maintaining the pawl solidly against the teeth in the circular opening. The resultant force should pass approximately centrally of the pawl teeth.

Where the bearings are integral with the head portion 23 as shown in my Patent No. 2,554,990 the function of adjustability of the bearing surfaces is sacrificed. For both adjustable and integral bearing surfaces, the resultant force should pass through the intermediate pawl teeth. FIGURES 6 and 7 show resultants passing through the intermediate pawl teeth for simplified versions of the pawl. FIGURE 6 shows an adjustable bearing 39 and a one-way pawl 40. FIGURE 7 shows an integral bearing surface 41 on a head portion 42 and a one-way pawl 43.

In FIGURE 6, a force vector A has been drawn representing the resultant force exerted by the adjustable bearing 39 on the pawl 40. This resultant is perpendicular to the flat surface of the bearing 39 and passes essentially through the center of the flat surface of the bearing. Slight changes in the pawl position will not appreciably affect the position of the resultant, and the resultant will always be approximately in the position shown for this type of bearing.

In FIGURE 7, the resultant force acting on the pawl 43 from the bearing surface 41 is represented by a vector C. However, the exact position of the resultant will depend on the pressure distribution along the bearing surface 41. Changes in the pawl position or inaccuracies of only a few thousandths of an inch in the bearing surface of either the pawl or the head portion will materially affect the pressure distribution along the bearing surface 41. If contact between the bearing surfaces is made only near the innermost part of the bearing surface of the pawl, the resultant may be represented by a vector D. Similarly, if contact is made only at the outermost part of the bearing surface of the pawl, the resultant may be represented by a vector B. With the arrangement as shown in FIGURE 7, it will be noted that regardless of where load contact occurs between the pawl and the head portion, the resultant force will pass through the intermediate pawl teeth and be fairly close to the center of the pawl teeth. Since the force acting on the pawl at any point on the bearing surface is perpendicular to the surface at that point, except for small deviations due to friction, then by limiting the innermost bearing contact to one having a perpendicular within the intermediate pawl teeth, the resultant force from the innermost bearing contact can be maintained within the intermediate pawl teeth.

In order to keep the resultant close to the theoretical resultant for maximum efficiency and also to reduce backlash, where the bearing is integral with the head portion, the pawl bearing surface in actual engagement therewith should be restricted to one side of a radial line drawn to the center of the pawl teeth. In FIGURE 7, the bearing surface of the pawl 43 is shown to be completely to one side of a radial line 44 drawn to the center of the pawl teeth. Where adjustable bearings are used, the bearing surface of the pawl may extend past a radial line to the center of the pawl teeth.

The pawl in accordance with all features of the invention has a bearing structure cooperating with either a fixed or an adjustable bearing structure of the head portion to provide for independent rocking or rotative movement of the pawl with respect to the teeth in the circular opening, about the teeth on either extremity of the pawl as a fulcrum for the rotative movement. By using the adjustable bearing construction or by proper positioning of the pawl and head portion bearing surfaces relative to the toothed arc of the pawl, the bearing surfaces operably engage to align and maintain the thrust resultant transmitted by the pawl through the intermediate pawl teeth. If the pawl should not be seated correctly and be engaged at only one end, a resultant passing through the intermediate pawl teeth will cause the engaged pawl teeth to act as a fulcrum to drive the other pawl teeth into full and concurrent engagement.

It is desirable for the maximum performance of a wide-arc toothed pawl that the bearing surfaces of the pawl and head portion allow for independent rotative positioning of the pawl about either of the extreme or end teeth of the pawl as a fulcrum and that the resultant force acting on the pawl from the bearing surface of the head portion passes through the intermediate pawl teeth over a range of rotative movement of the pawl needed to secure exact alignment. The conventional slide pawl which has a long bearing surface compared with the toothed surface of the pawl and fixed-pivot pawl used in round-head ratchets lack these characteristics and are therefore undesirable for use with a wide-arc pawl having a number of ratchet teeth.

The pawl in the embodiment shown in FIGURES 1 through 5 is controlled by an actuating member which may comprise springs 45 and 46. One end of each spring is bent down to enter one of the holes located at each end of the pawl 31 in angularly spaced relation. The other end of each spring is bent up to enter one of two spaced holes in the shift cap 29. The shift cap 29 serves as a reference having fixed positions relative to the head portion 23 to enable the springs 45 and 46 to act between or interconnect the pawl and the head portion. The rotational position of the shift cap, relative to the head portion 23, determines the tension in each spring. As shown in FIGURE 4, spring 45 is in extension and spring 46 in compression. The action of the springs is as follows for the position shown in FIGURE 4. Spring 46 resiliently urges the pawl 31 in an outwardly direction towards the teeth in the circular opening 24. Spring 45 resiliently holds the pawl to the bearing 35 during the back stroke. Spring 45 acts on the pawl in a direction providing an inward radial force in addition to a tangential or circumferential component of force.

With the springs as shown in FIGURE 4, the mechanism will drive in a clockwise direction. The operation is as follows. At the beginning of the back stroke, the pawl is solidly engaged as shown in FIGURE 3. As the handle is turned in a counterclockwise direction, the spring 45 maintains the pawl against the bearing 35 and also moves the bearing surface 33 of the pawl inwardly relative to the bearing 35 as the pawl teeth emerge from full engagement. The bearing surface 33 moves inwardly until the pawl makes contact with a circular stop 47. During further back motion, the pawl is pivoted about an axis provided by the stop 47, with the spring 46 releasably pressing the far end of the pawl into continued engagement with the teeth in the circular opening.

When all of the pawl teeth have been disengaged from the teeth in the circular opening, the pawl 31 has been placed in a position so that the bearing surface 33 of the pawl is at an angle with a line defining the load position of the bearing surface 33 of the pawl or with a line defining the load position of the bearing surface of the head portion. The lines 48 and 49 in FIGURES 6 and 7 are representative of the positions of the bearing surfaces of the pawls when the teeth on the far end of each pawl are disengaged for the type of control system shown in FIGURES 2 and 4, as adapted for minimum backlash with a wide-arc pawl. While the angle referred to may be small, it is important because it indicates that the pawl has not been restricted only to movement along the load line of the bearing surface of the head portion. If the pawl were restricted to movement only along such a load line, the backlash would increase substantially, particularly for a wide-arc pawl. For a very wide-arc pawl, the pawl would not completely disengage from the teeth in the wrench head, and the mechanism would be inoperative.

Turning the handle in a clockwise direction to start the forward stroke permits the bearing 35 to exert a force on the pawl bringing the toothed arc of the pawl into full engagement, when the position of the pawl will again be as shown in FIGURE 3. For driving in a counterclockwise direction, spring 46 will be in extension and spring 45 in compression, and the pawl 31 will be held against the bearing 36.

The shift cap 29 enables the operator to select the ratcheting direction. Manual rotation of the shift cap in a clockwise direction places the springs 45 and 46 in position to exert a clockwise directional force on the pawl independently of any previous position of the pawl in the recess to bring the pawl 31 against the bearing 35. The ratchet will now drive the work in a clockwise direction as previously indicated. Rotation of the shift cap in a counterclockwise direction reverses the directional force of the springs 45 and 46 to bring the pawl 31 against the bearing 36, and the ratchet will now drive in a counter-clockwise direction.

The shift cap is held in either of two positions by a detent ball 50 urged by a spring 51 against notches in the back of the stop 47, to which the shift cap is angularly secured. A rectangular extension 52 from the stop 47 projects into a rectangular recess in the bottom of the shift cap for holding the shift cap and stop together angularly.

Modified bearing structures are shown in FIGURES 8 and 9. FIGURE 8 shows a bearing 53 having two ends formed as opposed circular arcs. FIGURE 9 shows a bearing 54 having two circular arcs, but the arcs face the same way. In both bearings 53 and 54 the bearing surfaces form circular arcs which are non-concentric, being formed from different centers. Full contact may be obtained on both sides of these bearings for different rotative positions of the pawl as with the bearings 35 and 36 shown in FIGURES 3, 4, and 5.

FIGURE 8 illustrates a one-way pawl 55 which is held to the bearing 53 by a spring 56. The spring has ends which are normally inclined inwardly, as shown in FIGURE 10, which must be extended to enter holes in the pawl 55 and the bearing 53. The tension in the spring ends is such that the pawl is free, under load, to be aligned with the teeth in the driving member, but is otherwise held in substantially fixed relationship to the bearing 53 during the oscillating motion of the pawl where pawl 55 and bearing 53 move essentially as a unit. A pin 57 extends through the bearing 53 into a hole in the head portion to provide a fixed pivot center. The pawl motion is made about the axis provided by the pin 57, except for rotative motion during alignment corrections. A coil spring 58 holds the pawl against the teeth in the driving member. The pawl shown in FIGURE 8 is preferably made with fewer teeth than used for the embodiment of FIGURES 1 through 5 in order to minimize pawl motion.

The modification illustrated in FIGURE 9 has a pawl action similar to that of the embodiment shown in FIGURES 1 through 5. A wide-arc pawl 59 is resiliently held against the bearing 54 by a spring 60, which is always in extension. The spring 60 has hooked ends, which enter holes in the pawl and in a head portion 61. A spring 62 urges the pawl against the teeth in the driving member. The sidewalls of the head portion may serve as a stop for limiting the inward motion of the pawl end adjacent the bearing 54, or the direction and tension of the spring 60 may be adjusted so that once the pawl end adjacent to the bearing 54 has been withdrawn from the teeth in the driving member, the friction between the pawl 59 and the bearing 54 will prevent further inward motion of the adjacent pawl end.

The modification of the invention shown in FIGURE 11 has a pawl action similar to that of FIGURE 8, but does not have the adjustable bearing. In this embodiment, a pawl 63 is held to a bearing surface 64 of a head portion 65 by a cantilever spring 66. One end of the cantilever spring has an approximately V-shaped indentation for engaging a pin 67 on the pawl. The other end of the cantilever spring is securely held against any movement by a pin 68 which is press fitted into a hole in the head portion. A spring 69 urges the pawl against the teeth in the driving member. In operation, the pawl is adapted to pivot about the pin 67, which is held in position by the V-shaped indentation of the cantilever spring. The dotted line construction in FIGURE 11 shows the extreme inward pivotal position of the pawl. While providing an axis for oscillatory motion of the pawl, the cantilever spring at the same time has enough resiliency to allow the pin 67 to be shifted radially along the bearing surface 64 as the pawl makes alignment corrections under load. Maintaining the resultant between the intermediate pawl teeth with a reduced number of pawl teeth more suitable for this embodiment limits the size of the integral bearing surface. A semicylindrical bearing could advantageously be used with this embodiment and greatly increase the bearing area.

In the embodiment shown in FIGURE 11, as in FIGURE 8, the rotative axis of the pawl for withdrawal and reengagement of the pawl is non-concentric with the bearing surface of the pawl to permit the necessary degrees of freedom of movement of the pawl during alignment.

FIGURE 12 shows a modification of the invention having a single control element engaging and directing a pawl 70 in driving engagement with the radially extending teeth 25. In the illustrated embodiment, the single control element is a flexible guide 71, although the embodiment may be adapted to a non-resilient bar or guide having a resilient emplacement on the head portion. The flexible guide is slidably fitted within a radial slot in the pawl. The other end of the guide is held in fixed position by a pin 72 projecting from the top of a head portion 73. The guide is bent away from a normally straight position by the pin 72 and is held so that it exerts a counterclockwise force on the pawl and urges the pawl against a bearing 74. At the same time, the guide is inclined away from a radial direction and tends to rotate the pawl so that the pawl teeth nearest the bearing are withdrawn from engagement during the back stroke. The counterclockwise force exerted by the guide on the pawl acts at an angle with the face of the bearing 74 and tends to urge the pawl outwardly. Since the pawl teeth adjacent to the bearing have been withdrawn, the pawl teeth opposite the bearing are brought into engagement. As the handle is reversed for the forward stroke, the force exerted on the pawl by the bearing turns the pawl until all of the pawl teeth are brought into complete engagement.

FIGURE 13 shows another modification of the invention. A one-way pawl 75 is carried on the side of a head portion 76. A spring 77 is attached to a pin 78 mounted on the pawl. A second pin 79 mounted on the head portion bends the spring inwardly so that the pawl is urged towards the position shown in FIGURE 13 during the back stroke. In this embodiment, the walls of the head portion not only provide a bearing surface, but act as a control element directing the pawl. The walls of the head portion are shaped to provide an inward limit stop for the pawl motion. The walls also have a recess 80 which engages a projection 81 on the pawl to provide a tangential control for the pawl. In operation, the pawl is deflected inwardly by the spring 77 during the back stroke and pivoted at the base of the projection by the walls of the head portion. The pawl end opposite the bearing surface of the pawl is releasably held against the teeth in the driving member by the pivotal action of the pawl. Turning the handle counterclockwise drives the pawl against the bearing surface of the head portion and brings all of the pawl teeth into complete engagement.

A further modification of the invention is shown in FIGURE 14. This modification illustrates a radial motion of the pawl. In this embodiment, a reversible pawl 82 is carried in a concave recess on the side of a head portion 83. A radial guide 84 is slidably fitted to a slot in the pawl. The radial guide has an annular head pivotally mounted on the axis of the head portion. A control arrangement like that shown in FIGURES 1 through 5 is used for bringing the pawl into reversible engagement. The detent means shown in FIGURES 2 and 3 has been slightly modified in that a circular member 85 has a cylindrical section 86 for mounting the annular head of the radial guide. The pawl has holes at opposing ends for receiving control springs, not shown, similar to springs 45 and 46 in FIGURES 2 and 4, the action of which is best illustrated in FIGURE 18. The tension in the extended spring and the tension in the compressed spring are adjusted with respect to each other so that the control springs may produce a resultant in the direction of the vector E when the pawl is positioned as shown in FIGURE 14. It is evident that this adjustment may be readily accomplished by selected spacing of the ends of the springs. The vector E is at an angle to face 87 of the pawl tooth nearest the working bearing surface in order that the pawl may be forced out of engagement during the back stroke. The vector E is also at an angle with the bearing surface of the head portion contacting the pawl so that once the pawl is disengaged the control springs may force the pawl outwardly along the bearing surface of the head portion and engage the pawl with a new series of teeth in the driving member. The operation of the pawl is as follows. The control springs urge the pawl toward either selected side of the recess on the head portion. During the back stroke of the handle, the pawl oscillates radially and enters successive series of teeth in the driving member. During the forward stroke the pawl is engaged as shown in FIGURE 14. Reversal of the mechanism is accomplished with the use of a shift cap coupled to the control springs and stop as described for the embodiment of FIGURES 1 through 5. The vector E may point either in the direction shown in FIGURE 14 or in an analogous direction for the other side of the concave recess when the pawl is positioned to the other side of the recess.

To secure a resultant vector E, as shown in FIGURE 14, the tension in springs 93 and 94, shown diagrammatically in FIGURE 18, may be varied by the angular movement of a shift cap, much in the manner described applying to FIGURES 1 through 5. The direction of the vector E will additionally be a function of the positioning of the spring ends in the shift cap. By proper selection of the tensioning and positioning of the control springs 93 and 94, the forces due to the springs 93 and 94 may be represented by the vectors F and G, acting at angle $a$ with each other. The vector addition of the two forces F and G provides a resultant E' at angle $b$ with the bearing surface of the recess and at angle $c$ with the face 87 of the pawl tooth. The resultant control force E' passes through the pawl bearing, as shown in FIGURE 18. This force resiliently urges the pawl against the bearing surface of the recess and further to slide the pawl outwardly along the inclined bearing surface of the recess to bring the pawl into ratcheting engagement with the teeth in the opposing member. For the embodiment shown in FIGURES 1 through 5, where a stop may be employed for limiting the inward motion of the pawl, the vector E may be directed more toward the center.

Because of the alignment given by the radial guide 84, as illustrated in FIGURE 14, the pawl 82 is held in position for close alignment with the teeth in the wrench head. The small extra rotative motion of the pawl needed for exact alignment under various conditions of wear, stress, or because of small dimensional inaccuracies in manufacture, may be provided by the slight play which will be present in even a close fit of the guide 84 in the pawl slot or in the fit of the annular head of the guide around the cylindrical part of the circular member 85. The relatively light guide can also give slightly under load or be designated to have more resilience to permit slight rotative motion of the pawl under load. The pawl 82 retains the basic characteristic shown in the other embodiments of having a resultant from the bearing surfaces passing through the intermediate pawl teeth to force the pawl into as close alignment as possible and bring all of the pawl teeth into maximum use.

To facilitate the escapement of the pawl into a successive series of teeth in the driving member, the tops of the internal teeth may be cut back as shown in FIGURE 14 for radial operation of the pawl. Otherwise, the extreme pawl teeth will extend over one additional internal tooth during part of the ratcheting cycle, and the pawl could lock in the position shown in FIGURE 15. If the internal teeth are cut back at least as far as the heavy dotted line shown in FIGURE 15, the extreme pawl teeth cannot extend over an additional internal tooth.

For non-radial operation of the pawl, the teeth in the driving member may have sharp crests or may be formed with flats, depending on other design requirements. Even if the teeth are formed with flats, a defective pawl engagement is possible with non-radial operation of the pawl as exemplified by FIGURE 16. Here one end tooth 88 of a pawl 89 is still riding on a flat 90 of an internal tooth, while the other end tooth 91 has passed a corresponding flat 92 and is now entered into the next internal tooth. If the driving stroke is made at this point, only a few pawl teeth are engaged and those incorrectly. In addition, the bearing surfaces of the pawl and head portion are not properly engaged. The control system must be designed in this case to hold the pawl tooth 91 from engagement with the internal tooth until the pawl tooth 88 passes the flat 90 and enters the next internal tooth of the driving member.

Various control organizations have been illustrated and described for the operation of the multi-toothed pawl of the invention. As shown in the drawings and described herein, the pawl may have a fixed or an adjustable bearing structure which permits the pawl to come into exact alignment with opposing teeth in a tooth-carrying body. One of the most useful forms of the invention which is particularly adapted to ratchet mechanisms where compactness is essential encompasses the use of a reversible pawl with all of the teeth thereof being used for driving in either direction. Features of the invention found particularly useful in operating this pawl, and which were not shown or described in my Patent No. 2,554,990, include the use of control elements resiliently urging the pawl against the teeth in the driving member, elements exerting a resilient tangential force on the pawl, elements loading the pawl against the bearing surface of the head portion during the back stroke, elements having a combined tangential and inward force action, and elements having a tangential force but located on the bearing side of a radial line drawn to the center of the pawl teeth.

Various modes of operation have been described for this type of pawl, using the above described control elements. These control elements have proven particularly successful in controlling the pawl during the important reengagement part of the ratcheting cycle, regardless of how the pawl may be controlled during the back stroke. As illustrated in FIGURES 15 and 16, the multitooth pawl is capable of defective engagement with the teeth in the driving member, and for that reason the controls must position the pawl as the pawl enters full reengagement so that the teeth mesh properly. Controls using features of the invention listed above have proven successful from this standpoint, as well as having other desirable characteristics, such as light ratcheting action and small backlash. The control elements listed above may also be adapted to reversible operation, using a manual shift that does not require that the handle be turned relative to the work before reversal can be effected, as was necessary for the controls shown in my Patent No. 2,554,990.

Other features of the invention have been illustrated and described relating to improved forms of pivotal control elements which may be advantageously employed with the type of pawl used in the invention.

Still other features have been illustrated and described relating to bearing elements which are adjustable to the bearing surfaces of multitooth pawls.

While preferred embodiments of the invention have been illustrated and described, it will be understood that other variations may be made which advantageously use the teaching of this invention and which are intended to be within the scope of the invention as defined in the following claims.

What is claimed is:

1. In a ratchet mechanism, the combination of a driving member and a work-turning member, one of said members having an opening therein with inwardly extending teeth and the other having a head portion rotatably mounted in said opening, pawl means carried by said head portion, said pawl means having a plurality of teeth adapted to cooperate with the teeth of said opening for holding the pawl means in locking engagement with said one member during the forward stroke of the driving member, said pawl means and head portion each having a thrust-bearing surface adapted to transmit the thrust of the pawl means to the head portion during the forward stroke of the driving member, a bearing interposed between the pawl means and head portion, said bearing having two bearing surfaces, one bearing surface being formed to mate with the thrust-bearing surface of said pawl means and the other bearing surface being formed to mate with the thrust-bearing surface of said head portion, the two bearing surfaces of said bearing being formed from two different centers of curvature to provide at least two degrees of freedom between said pawl means and said head portion and for alignment of the teeth of the pawl means with the teeth of said opening, and means for bringing the pawl means into releasable engagement with the teeth of said opening.

2. A reversible ratchet mechanism comprising two body members slidably mounted with respect to each other, one of said body members having a surface provided with a series of ratchet teeth, a pawl carried by the other of said body members, said pawl having a plurality of teeth adapted to concurrent driving engagement with the ratchet teeth of said one body member, all of said pawl teeth being used for driving for both directions, said pawl and said other body member each having two thrust-bearing surfaces adapted to transmit the thrust of the pawl to said other body member for the two driving directions, a pair of bearings interposed between the thrust-bearing surfaces of the pawl and said other body member, each of said bearings having two bearing surfaces, one bearing surface being formed to mate with one of the thrust-bearing surfaces of the pawl and the other bearing surface being formed to mate with one of the thrust-bearing surfaces of said other body member, the two bearing surfaces of each of said bearings having different centers of curvature so formed that the pawl may have freedom for alignment with the ratchet teeth of said one body member while maintaining substantially full contact with either of said bearings, and control means for directing the pawl in reversible engagement with the ratchet teeth of said one body member.

3. In a ratchet mechanism, the combination of a driving member and a work-turning member, one of said members having a circular opening with inwardly extending teeth and the other having a head portion rotatably mounted in said circular opening, a pawl carried by the head portion, said pawl having an arcuate side provided with a plurality of teeth adapted to concurrent driving engagement with the teeth in said circular opening, said pawl having a bearing surface toward one end of said arcuate side for transmitting the thrust of the pawl to the head portion, said head portion having a bearing surface adapted to engage the bearing surface of said pawl, the bearing surfaces of the pawl and head portion being so constructed and positioned relative to said plurality of teeth on the arcuate side of the pawl that the resultant contacting force therebetween passes through the intermediate pawl teeth when alternately either end of said teeth on the pawl is fully engaged while the other end of said teeth on the pawl is partially engaged, whereby the pawl teeth may be brought into full engagement with the teeth in said circular opening, and control means for bringing the pawl into releasable engagement with the teeth in said circular opening, said control means having a yieldable member acting between the pawl and head portion resiliently holding the pawl against the bearing surface of the head portion.

4. In a ratchet mechanism, the combination of a driving member and a work-turning member, one of said members having a circular opening with inwardly extending teeth and the other having a head portion rotatably mounted in said circular opening, a pawl carried by the head portion, said pawl having an arcuate side provided with a plurality of teeth adapted to concurrent driving engagement with the teeth in said circular opening, said pawl having a bearing surface at one end of said arcuate side for transmitting the thrust of the pawl to the head portion, said head portion having a bearing surface adapted to engage the bearing surface of said pawl, the bearing surfaces of the pawl and head portion being so constructed and positioned relative to said plurality of teeth on the arcuate side of the pawl that the resultant contacting force therebetween passes through the intermediate pawl teeth when alternately either end of said teeth on the pawl is fully engaged while the other end of said teeth on the pawl is partially engaged, whereby the pawl teeth may be brought into full engagement with the teeth in said circular opening, and control means for bringing the pawl into releasable engagement with the teeth in said circular opening, said control means comprising a yieldable member supported by one of said work-turning and driving members, said yieldable member engaging the pawl to urge the pawl against the teeth in said circular opening, said yieldable member acting on said pawl with a resilient force directed outwardly toward the teeth in said circular opening.

5. In a ratchet mechanism, the combination of a driving member and a work-turning member, one of said members having a circular opening with inwardly extending teeth and the other having a head portion rotatably mounted in said circular opening, a pawl carried by the head portion, said pawl having a plurality of teeth formed along an arc and adapted to concurrent driving engagement with the teeth in said circular opening, the pawl having a bearing surface for transmitting the thrust of the pawl to the head portion, said head portion having a bearing surface adapted to engage the bearing surface of the pawl, the bearing surfaces of said pawl and head portion being so constructed that the bearing surface of the pawl may slide inwardly relative to the bearing surface of the head portion as the pawl teeth emerge from full engagement with the teeth in said circular opening, the bearing surface of the pawl in contact with the bearing surface of the head portion under load conditions being positioned to one side of a radial line drawn to the center of the pawl teeth, the bearing surface of the pawl being so formed that a line drawn normal to the innermost bearing contact between the pawl and head portion under load conditions will pass through the intermediate pawl teeth, said pawl having sufficient freedom with respect to said head portion to provide for movement thereof radially away from the teeth in said circular opening and movement circumferentially away from said bearing surface of the head portion, and control means for bringing the pawl into releasable engagement with the teeth in said circular opening, said control means comprising means acting between said pawl and head portion and arranged to exert a resilient force on said pawl in a direction opposite to at least one of said directions of movement for the pawl.

6. In a ratchet mechanism, the combination of a driving member and a work-turning member, one of said members having a circular opening with inwardly extending teeth and the other having a head portion rotatably mounted in said circular opening, a pawl carried by the head portion, said pawl having an arcuate side formed with a plurality of teeth adapted to concurrent driving engagement with the teeth in said circular opening, the pawl having a bearing surface at one end of said arcuate side for transmitting the thrust of the pawl to the head portion, said head portion having a bearing surface adapted to engage the bearing surface of the pawl, the bearing surfaces of the pawl and head portion bing so constructed that the bearing surface of the pawl may slide inwardly relative to the bearing surface of the head portion as the pawl teeth emerge from full engagement with the teeth in the circular opening, said pawl having sufficient freedom with respect to said head portion to provide for movement thereof radially away from the teeth in said circular opening and movement circumferentially away from said bearing surface of the head portion, and control means for bringing the pawl into releasable engagement with the teeth in said circular opening, said control means comprising means acting between said pawl and head portion and arranged to exert a resilient force on said pawl in a direction opposite to at least one of said directions of movement for the pawl, said control means being adapted to urge the pawl into a position where the bearing surface of the pawl is at an angle with a line defined by the load position of the bearing surface of the pawl when all of the pawl teeth have been disengaged, whereby the backlash may be reduced.

7. A ratchet mechanism according to claim 6, wherein said control means is further adapted to urge the pawl into a position where one end of said pawl teeth is maintained from full engagement with the teeth in said circular opening during the back stroke, while the other end of said pawl teeth is releasably pressed against the teeth in said circular opening.

8. In a ratchet mechanism, the combination of a driving member and a work-turning member, one of said members having a circular opening with inwardly extending teeth and the other having a head portion rotatably mounted in said circular opening, a pawl carried by the head portion, said pawl having a plurality of teeth formed along an arc and adapted to concurrent driving engagement with the teeth in said circular opening, the pawl having a bearing surface for transmitting the thrust of the pawl to the head portion, said head portion having a bearing surface adapted to engage the bearing surface of the pawl, the bearing surfaces of said pawl and head portion being so constructed that the bearing surface of the pawl may slide inwardly relative to the bearing surface of the head portion as the pawl teeth emerge from full engagement with the teeth in said circular opening, the bearing surface of the pawl in contact with the bearing surface of the head portion under load conditions being positioned to one side of a radial line drawn to the center of the pawl teeth, the bearing surface of the pawl being so formed that a line drawn normal to the innermost bearing contact between the pawl and head portion under load conditions will pass through the intermediate pawl teeth, and control means for bringing the pawl into engagement with the teeth in said circular opening, said control means comprising a control element operatively interconnecting said head portion and said pawl and engaging the pawl to one side of a radial line drawn to the center of the pawl teeth and to that side of the pawl nearest the bearing surface of the head portion, said control element holding the pawl toward the bearing surface of said head portion.

9. In a ratchet mechanism, the combination of a driving member and a work-turning member, one of said members having a circular opening with inwardly extending teeth and the other having a head portion rotatably mounted in said circular opening, a pawl carried by the head portion, said pawl having a plurality of teeth formed along an arc and adapted to concurrent driving engagement with the teeth of the circular opening, the pawl having a bearing surface for transmitting the thrust of the pawl to the head portion, said head portion having a bearing surface adapted to engage the bearing surface of the pawl, and control means for directing the pawl in engagement with the teeth in said circular opening, said control means comprising means operatively engaging the pawl to hold the pawl in position for pivotal movement, for at least part of the ratcheting cycle, about an axis located to one side of a radial line drawn centrally of the pawl teeth and toward said bearing surface of the head portion, the bearing surfaces of the pawl and head portion being so constructed and arranged to provide the pawl with freedom to adjust to the teeth in said circular opening independently of the rotative movement of the pawl about said axis.

10. In a ratchet mechanism, the combination of a driving member and a work-turning member, one of said members having a circular opening with inwardly extending teeth and the other having a head portion rotatably mounted in said circular opening, a pawl carried by the head portion, said pawl having an arcuate side formed with a plurality of teeth adapted to concurrent driving engagement with the teeth in said circular opening, the pawl having a bearing surface at one end of said arcuate side for transmitting the thrust of the pawl to the head portion, said head portion having a bearing surface adapted to engage the bearing surface of said pawl, the bearing surfaces of said pawl and head portion being so constructed that the bearing surface of the pawl may slide inwardly relative to the bearing surface of the head portion as the pawl teeth emerge from full engagement, said pawl having sufficient freedom with respect to said head portion to provide for movement thereof radially away from the teeth in said circular opening and movement circumferentially away from the said bearing surface of the head portion, and control means for bringing the pawl into releasable engagement with the teeth in said circular opening, said control means comprising two control elements acting between the pawl and said head portion, said control elements engaging the pawl at different angular locations relative to said arcuate side of the pawl with the control element closest to the bearing surface of said pawl holding the pawl toward the bearing surface of said head portion and the other control element urging the pawl against the teeth in said circular opening.

11. In a ratchet mechanism, the combination of a member having an opening therein and a second member having a head portion rotatably mounted in said opening, one of the aforementioned said members having a cylindrical surface with radially extending teeth confronting the other member inside said opening, said other members having a recess therein open to the radially extending teeth of said one member, a pawl carried in said recess, the size of the pawl being smaller than the size of the recess to permit circumferential displacement of said pawl along the direction of said radially extending teeth and withdrawal from said radially extending teeth, said pawl having an arcuate side formed with a plurality of teeth adapted to concurrent driving engagement with the radially extending teeth of said one member, all of said pawl teeth being used for driving for both directions, said pawl having two bearing surfaces generally inclined toward each other in a direction away from said arcuate side, said recess having two bearing surfaces adapted to engage the bearing surfaces of the pawl, one bearing surface of said recess taking the thrust of the pawl for one direction and the other bearing surface of said recess taking the thrust of the pawl for the other driving direction, and control means for bringing the pawl into reversible driving engagement with the teeth of said one member, said control means including yieldable means, acting between the pawl and said other member, resiliently urging the pawl into contact with either selected bearing surface of said recess.

12. A ratchet mechanism according to claim 11, wherein said yieldable means is so arranged and adapted to be positioned relative to said pawl and said other member as to urge the pawl toward a selected bearing surface of said recess independently of any position of said pawl in the recess, said control means including means for positioning said yieldable means to urge the pawl toward the selected bearing surface of said recess.

13. A ratchet mechanism according to claim 11, wherein the bearing surfaces of the pawl and recess are planar, and said yieldable means provides a force to continuously urge the pawl into contact with a selected one of said planar bearing surfaces of the recess throughout the back stroke.

14. A ratchet mechanism according to claim 11, wherein said control means urges the pawl against a selected bearing surface of said recess into a position where one end of said teeth along the arcuate side of the pawl is withdrawn from the radially extending teeth of said one member for at least a predominant part of the back stroke, while the other end of said teeth on the pawl is releasably engaged with the radially extending teeth of said one member throughout the back stroke.

15. In a ratchet mechanism, the combination of a member having an opening therein and a second member having a head portion rotatably mounted in said opening, one of the aforementioned said members having a cylindrical surface with radially extending teeth confronting the other member inside said opening, said other member having a recess therein open to the radially extending teeth of said one member, a pawl carried in said recess, the size of the pawl being smaller than the size of the recess to permit circumferential displacement of said pawl along the direction of said radially extending teeth and withdrawal from said radially extending teeth, said pawl having an arcuate side formed with a plurality of teeth adapted to concurrent driving engagement with the radially extending teeth of said one member, all of said pawl teeth being used for driving for both directions, said pawl having two bearing surfaces generally inclined toward each other in a direction away from said arcuate side, said recess having two bearing surfaces adapted to engage the bearing surfaces of the pawl, one bearing surface of said recess taking the thrust of the pawl for one direction and the other bearing surface of said recess taking the thrust of the pawl for the other driving direction, and control means for bringing the pawl into reversible driving engagement with the teeth of said one member, said control means including a control member acting on the pawl with a resilient force directed toward said radially extending teeth and a second control member acting between the pawl and said other member engaging said pawl to maintain the pawl toward a selected bearing surface of said recess.

16. A ratchet mechanism according to claim 15, wherein said second control member acts on the pawl in a direction at an angle with a circumferential line at the point of engagement thereof and in a direction away from the radially extending teeth of said one member.

17. In a ratchet mechanism, the combination of a member having an opening therein and a second member having a head portion rotatably mounted in said opening, one of the aforementioned said members having a cylindrical surface with radially extending teeth confronting the other member inside said opening, said other member having a recess therein open to the radially extending teeth of said one member, a pawl carried in said recess, the size of the pawl being smaller than the size of the recess to permit circumferential displacement of said pawl along the direction of said radially extending teeth and withdrawal from said radially extending teeth, said pawl having an arcuate side formed with a plurality of teeth adapted to concurrent driving engagement with the radially extending teeth of said one member, all of said pawl teeth being used for driving for both directions, said pawl having two bearing surfaces generally inclined toward the other in a direction away from said arcuate side, said recess having two bearing surfaces adapted to engage the bearing surfaces of the pawl, one bearing surface of said recess taking the thrust of the pawl for one direction and the other bearing surface of said recess taking the thrust of the pawl for the other driving direction, and control means for bringing the pawl into reversible driving engagement with the teeth of said one member, said control means comprising means engaging the pawl for selectively maintaining said pawl toward either bearing surface of said recess and means for holding the above last-named means in either of two positions to selectively position said pawl toward either bearing surface of said recess, said control means acting on the pawl with a resilient force directed generally toward the radially extending teeth to urge the pawl against the radially extending teeth of said one member.

18. In a ratchet mechanism, the combination of a member having a head and a second member having a head portion rotatably mounted in said head, one of the aforementioned members having a cylindrical surface formed with radially extending teeth confronting the other member inside said head, a pawl carried by said other member and positioned to engage and disengage said radially extending teeth, said pawl having an arcuate side formed with a plurality of teeth adapted to the radially extending teeth of said one member, all of said pawl teeth being used for driving for both directions, said pawl having a bearing surface at each end of the arcuate side of the pawl, the bearing surfaces of said pawl being inclined toward each other in a direction away from said arcuate side, said other member having two bearing surfaces adapted to engage the bearing surfaces of the pawl, one bearing surface of said other member taking the thrust of the pawl for one direction and the second bearing surface of said other member taking the thrust of the pawl for the opposite direction, the bearing surfaces of said other member being spaced farther apart than the bearing surfaces of the pawl, and control means for bringing the pawl into reversible driving engagement with the radially extending teeth of said one member, said control means including a manually shiftable member positioned on one of said members and having two operative positions relative to said other member, said control means includig actuating means engaging the pawl for moving the pawl toward a selected bearing surface of said other member, said actuating means being operatively connected to said manually shiftable member so that movement of the manually shiftable member to a selected one of said operative positions displaces the actuating means relative to said other member, the displacement of said actuating means moving the pawl toward a selected bearing surface of said other member.

19. A ratchet mechanism according to claim 18, wherein said pawl actuating means comprises flexible spring means engaging the pawl, and said manually shiftable member is arranged to act on said flexible spring means to maintain same in displaced position relative to said other member.

20. A ratchet mechanism according to claim 18, wherein said control means further includes detent means positioned on said other member and operatively connected to said manually shiftable member for holding the manually shiftable member in either of said operative positions.

21. In a ratchet mechanism, the combination of a member having an opening therein and a second member having a head portion rotatably mounted in said opening, one of the aforementioned said members having a cylindrical surface with radially extending teeth confronting the other member inside said opening, said other member having a recess therein open to the radially extending teeth of said one member, a pawl carried in said recess, the recess being of a size sufficient to provide for radial and circumferential displacement of the pawl within the recess, said pawl having an arcuate side formed with a plurality of teeth adapted to concurrent driving engagement with said radially extending teeth, all of said pawl teeth being used for driving for both directions, said pawl having a bearing surface on each end of said arcuate side with each bearing surface being generally inclined toward the other in a direction away from said arcuate side, the recess having two bearing surfaces with each recess bearing surface being adapted to engage a pawl bearing surface, one bearing surface of the recess receiving the thrust of the pawl for one driving direction and the other bearing surface receiving the thrust of the pawl for the other driving direction, the bearing surfaces of said recess being formed along straight lines which converge in a direction away from the radially extending teeth of said one member, the straight bearing surfaces of said recess permitting disengagement of the pawl from the radially extending teeth of said one member with a minimum amount of circumferential movement to thus decrease the backlash of the ratcheting action, and control means for bringing the pawl into reversible driving engagement with the radially extending teeth of said one member.

22. In a ratchet mechanism designed for minimum size and high torque capacity, the combination of a member having an opening therein and a second member having a head portion rotatably mounted in said opening, one of the aforementioned members having a cylindrical surface with radially extending teeth confronting the other member inside said opening, said other member having an arcuate surface closely fitted to a circumferential surface defined by the tops of said radially extending teeth to provide said rotatable mounting, said other member having a recess therein oppositely positioned in diametrical relation to said arcuate surface and open to said radially extending teeth, a pawl carried in the recess, the recess being of a size sufficient to provide for radial and cicumferential displacement of the pawl within the recess, said pawl having a relatively long arcuate side formed with teeth adapted to the teeth of said one member, all of said pawl teeth being employed for driving for both directions, said pawl having two bearing surfaces at the ends of said arcuate side of the pawl which converge in a direction opposite to the arcuate side of the pawl, said recess having two converging sidewalls which are adapted to the two bearing surfaces of the pawl for receiving the thrust of the pawl for the two driving directions, the thrust of the pawl being transmitted through the head portion to the tops of said radially extending teeth, and control means for bringing the pawl into reversible driving engagement with the teeth of said one member.

23. A ratchet mechanism according to claim 22, wherein said bearing surfaces of the pawl and the sidewalls of the recess are planar, and said control means includes manually shiftable means operatively connected to the pawl for moving the pawl toward either selected planar sidewall of said recess.

24. A ratchet mechanism as set forth in claim 11, wherein the bearing surfaces of the pawl and said other member are so constructed and arranged relative to the teeth on the pawl that the resultant force vector arising from the engagement of the bearing surfaces passes between the end teeth on the arcuate side of the pawl independently of small differences in positioning of the pawl bearing surfaces and said recess bearing surfaces.

References Cited in the file of this patent

UNITED STATES PATENTS

| | | |
|---|---|---|
| 70,371 | Smith | Oct. 29, 1867 |
| 617,143 | Corser | Jan. 3, 1899 |
| 710,593 | Medley | Oct. 7, 1902 |
| 1,944,069 | Connors | Jan. 16, 1934 |
| 2,395,681 | Odlum et al. | Feb. 26, 1946 |
| 2,554,990 | Kilness | May 29, 1951 |

FOREIGN PATENTS

| | | |
|---|---|---|
| 969,573 | France | Dec. 21, 1950 |
| 61,345 | France | Apr. 25, 1955 |
| | (Addition to No. 1,021,077) | |

UNITED STATES PATENT OFFICE
CERTIFICATE OF CORRECTION

Patent No. 3,044,591            July 17, 1962

Luther E. Kilness

It is hereby certified that error appears in the above numbered patent requiring correction and that the said Letters Patent should read as corrected below.

Column 1, line 18, for "specie" read -- species --; column 3, line 72, for "curavture" read -- curvature --; column 4, line 37, for "acing" read -- acting --; column 7, line 3, before "which" insert -- and --; column 9, line 41, for "designated" read -- designed --; line 53, for "or" read -- of --; column 12 line 54, for "bing" read -- being --; column 14, line 21, for "members" read -- member --; column 16, line 10, for "etxending" read -- extending --; line 14, for "includig" read -- including --; column 17, line 6, for "cicumferential" read -- circumferential --.

Signed and sealed this 7th day of May 1963.

(SEAL)
Attest:

ERNEST W. SWIDER
Attesting Officer

DAVID L. LADD
Commissioner of Patents